Patented Aug. 17, 1926.

1,596,613

UNITED STATES PATENT OFFICE.

EMIL KLARMANN, OF JERSEY CITY, NEW JERSEY, ASSIGNOR TO LEHN & FINK, INC., OF NEW YORK, N. Y., A CORPORATION OF NEW YORK.

2, 4-DIHYDROXYDIPHENYLETHANE AND PROCESS OF MAKING IT.

No Drawing.  Application filed December 15, 1925. Serial No. 75,619.

This invention consists of the novel organic product specified and the method of making it, which product possesses valuable therapeutic properties, and, more especially, as an internal antiseptic. It has a high germicidal action, and especially as regards *B. typhosus*. Its phenol coefficient as determined by the standard method of the U. S. Hygienic Laboratory is approximately 43, whereas its toxicity is remarkably low.

In a previous patent application, Serial No. 61,335, filed October 8th, 1925, I have specified that 2, 4-dihydroxydiphenylethane shows a high phenol coefficient and at the same time a low toxicity which would justify its use as an internal antiseptic. I have now found that 2,4-dihydroxydiphenylethane shows a similar behavior. The way to obtain it is different from that in the case of the dihydroxydiphenylmethane. A ketoimidohydrochloride is first obtained by the condensation of resorcinol and benzyl cyanide. This is then transformed into the metadihydroxydeshydroxybenzoin (2,4-dihydroxyphenylbenzylketone), the latter being reduced to the 2,4 dihydroxydiphenylethane.

The process may be graphically illustrated by the following equations:

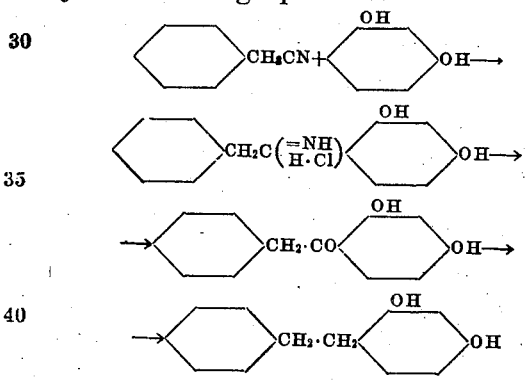

In preparing 2, 4 dihydroxydiphenylethane, I preferably proceed as follows: 5 grams of resorcinol and 5 grams of benzyl cyanide are dissolved in 40 cc. of dry ether and 2 grams of dry $ZnCl_2$ are added. A current of dry HCl is allowed to pass through this mixture for 2½ to 3 hours. The flask is allowed to stand in an ice box over night. Then dilute HCl (1:1) is added. A yellow crystalline precipitate of the ketoimidohydrochloride soon forms. The formation is accelerated by vigorous shaking of the flask or rubbing with a glass rod. The precipitate is freed from the unchanged raw materials by ether, dried and dissolved in 500 cc. of water. It is then boiled under reflux for 25 minutes. The keto compound precipitates in the form of needles upon standing. It may be recrystallized from water. m. p. 121° C. (uncorr.) dark red coloration with dilute $FeCl_3$.

The compound thus obtained is now reduced by heating with HCl (1:3) and amalgamated zinc for 16 hours. It crystallizes from water in flattened needles m. p. 131° C. (uncorr.)

Analysis 10.573 mg. give 30,090 mg. $CO_2$ and 6.780 mg. $H_2O$ i. e., 78.06% C. and 7.21% H.

Theory $C_{14}H_{16}O_2$ 77.75% C. and 7.46% H.

Structurally the graphic formula of the new product is:—

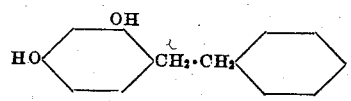

The phenol coefficient determined according to the method of the U. S. Hygienic Laboratory, as stated above, is about 43. For this determination, the compound is applied in a watery suspension prepared by mixing of a solution of it in very little alcohol with distilled water.

Having thus fully described the invention, what I claim as new and desire to secure by Letters Patent is:

1. As a new composition of matter, 2,4-dihydroxydiphenylethane, having the structural formula as follows:

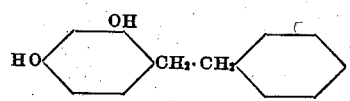

2. The process of making 2,4-dihydroxydiphenylethane, which consists in first forming the corresponding ketoimidohydrochloride; then transforming this product into metadihydroxydeshydroxybenzoin (2, 4 dihydroxyphenylbenzylketone), and finally reducing the product to 2,4 dihydroxydiphenylethane.

3. The process which consists in making 2, 4 dihydroxydiphenylethane by the reduction of meta dihydroxydesoxybenzoin (2, 4 dihydroxyphenylbenzylketone).

In testimony whereof I have signed the foregoing specification.

EMIL KLARMANN.